(12) United States Patent
Shin et al.

(10) Patent No.: US 9,790,630 B2
(45) Date of Patent: Oct. 17, 2017

(54) LAUNDRY TREATING APPARATUS AND METHOD FOR CONTROLLING THE SAME

(71) Applicant: LG ELECTRONICS INC., Seoul (KR)

(72) Inventors: Hyosang Shin, Changwon-si (KR); Hyunsang Kim, Changwon-si (KR); Minkyu Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 276 days.

(21) Appl. No.: 14/022,888

(22) Filed: Sep. 10, 2013

(65) Prior Publication Data

US 2014/0085046 A1    Mar. 27, 2014

(30) Foreign Application Priority Data

Sep. 21, 2012  (KR) .................. 10-2012-0105231

(51) Int. Cl.
| | | |
|---|---|---|
| *G08C 19/00* | (2006.01) | |
| *D06F 33/02* | (2006.01) | |
| *D06F 39/00* | (2006.01) | |
| *D06F 37/42* | (2006.01) | |
| *G06Q 20/32* | (2012.01) | |
| *G07C 9/00* | (2006.01) | |

(52) U.S. Cl.
CPC ............. *D06F 33/02* (2013.01); *D06F 37/42* (2013.01); *D06F 39/005* (2013.01); *G06Q 20/325* (2013.01); *G06Q 20/3278* (2013.01); *G07C 9/00896* (2013.01); *D06F 2210/00* (2013.01); *D06F 2216/00* (2013.01)

(58) Field of Classification Search
CPC ........... G06Q 20/3278; G06Q 20/3255; G06Q 20/325; D06F 2210/00; D06F 2216/00; D06F 33/02; D06F 37/42; D06F 39/005; G07C 9/00896
USPC ........................................................ 340/5.7
See application file for complete search history.

(56) References Cited

U.S. PATENT DOCUMENTS

| | | | |
|---|---|---|---|
| 2002/0010515 A1* | 1/2002 | Fukuoka .............. | G06Q 20/027 700/9 |
| 2003/0130902 A1* | 7/2003 | Athwal .............. | G06Q 30/0601 705/26.1 |
| 2003/0179746 A1* | 9/2003 | Moon .................. | D06F 39/005 370/352 |
| 2004/0051636 A1* | 3/2004 | Gallagher ............... | D06F 33/02 340/531 |
| 2004/0162884 A1* | 8/2004 | Jeon .................... | H04L 12/2803 709/208 |

(Continued)

FOREIGN PATENT DOCUMENTS

| | | |
|---|---|---|
| CN | 1319697 A | 10/2001 |
| CN | 1326029 A | 12/2001 |

(Continued)

*Primary Examiner* — Naomi Small
(74) *Attorney, Agent, or Firm* — Dentons US LLP

(57) ABSTRACT

The present invention provides a laundry treating apparatus including a cabinet, an accommodating unit within the cabinet to hold laundry, a door provided on one face of the cabinet to access the accommodating unit, a control panel to receive a washing cycle control order, a first communication module to communicate with a mobile communication terminal through a local area network to receive ID information.

24 Claims, 5 Drawing Sheets

(56) References Cited

U.S. PATENT DOCUMENTS

| | | | |
|---|---|---|---|
| 2005/0260993 A1* | 11/2005 | Lovell, Jr. | G06Q 20/16 455/445 |
| 2006/0190266 A1* | 8/2006 | Tanigawa | D06F 39/003 704/273 |
| 2007/0027696 A1* | 2/2007 | Burger | 705/1 |
| 2008/0105001 A1* | 5/2008 | Jeong | D06F 33/02 68/12.02 |
| 2011/0295706 A1* | 12/2011 | Urquhart | G06Q 20/10 705/16 |
| 2012/0271901 A1* | 10/2012 | Kim | H04L 67/025 709/208 |

FOREIGN PATENT DOCUMENTS

| | | |
|---|---|---|
| CN | 1620676 A | 5/2005 |
| CN | 1704520 A | 12/2005 |
| CN | 1912910 A | 2/2007 |
| CN | 101025806 A | 8/2007 |
| CN | 101501717 A | 8/2009 |
| CN | 102088680 A | 6/2011 |
| EP | 2701339 A2 | 2/2014 |
| KR | 2005 0114355 A | 12/2005 |
| WO | 2013/027939 A1 | 2/2013 |

* cited by examiner

[Fig. 1]
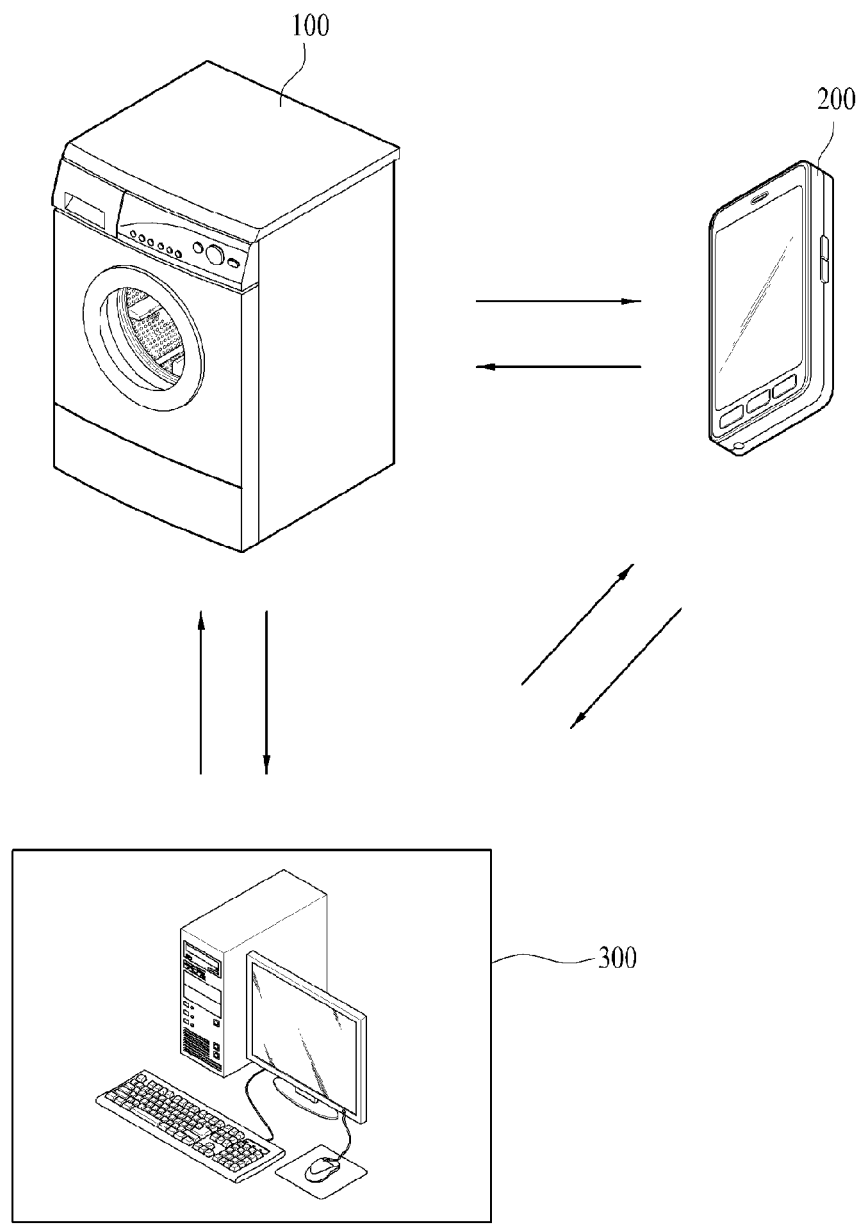

[Fig. 2]
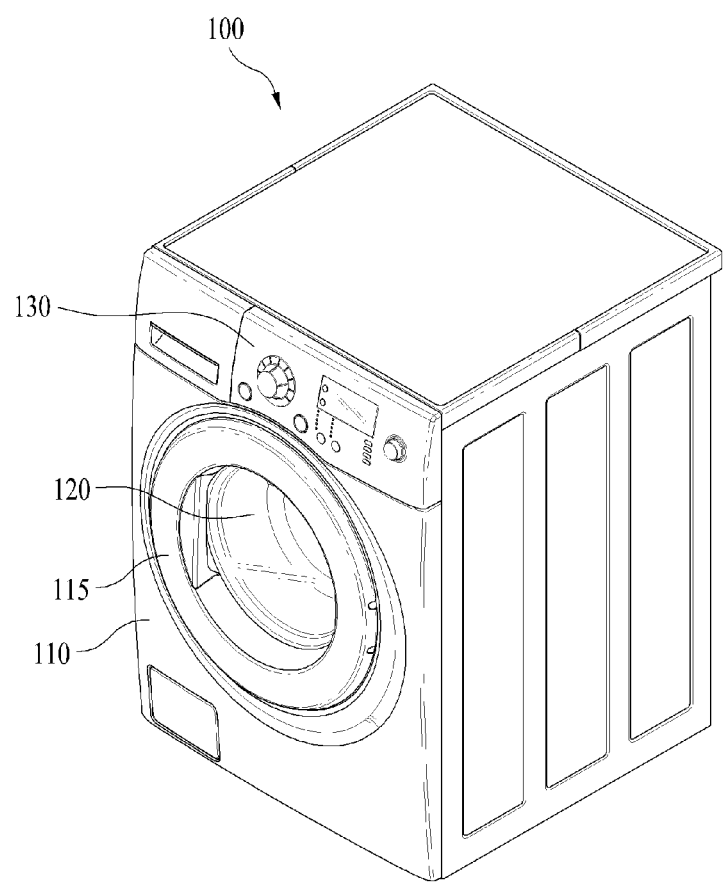

[Fig. 3]
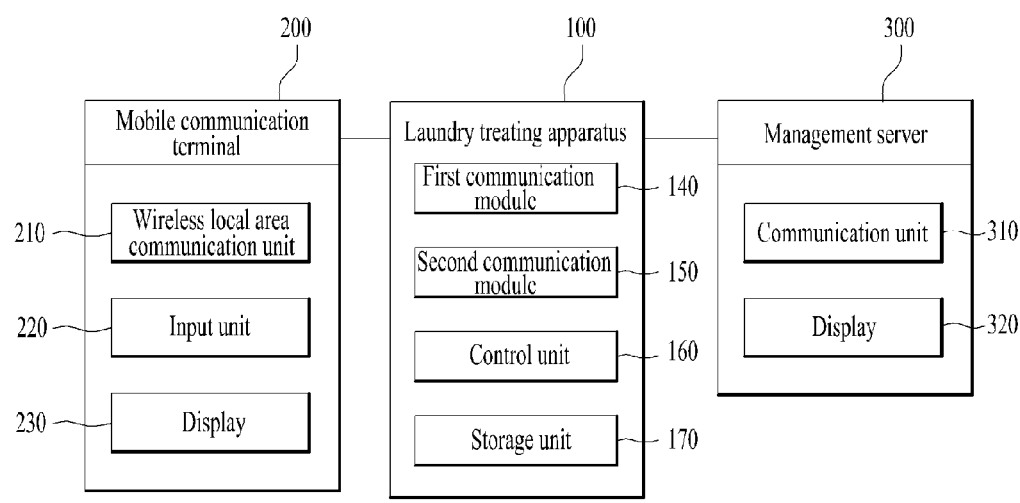

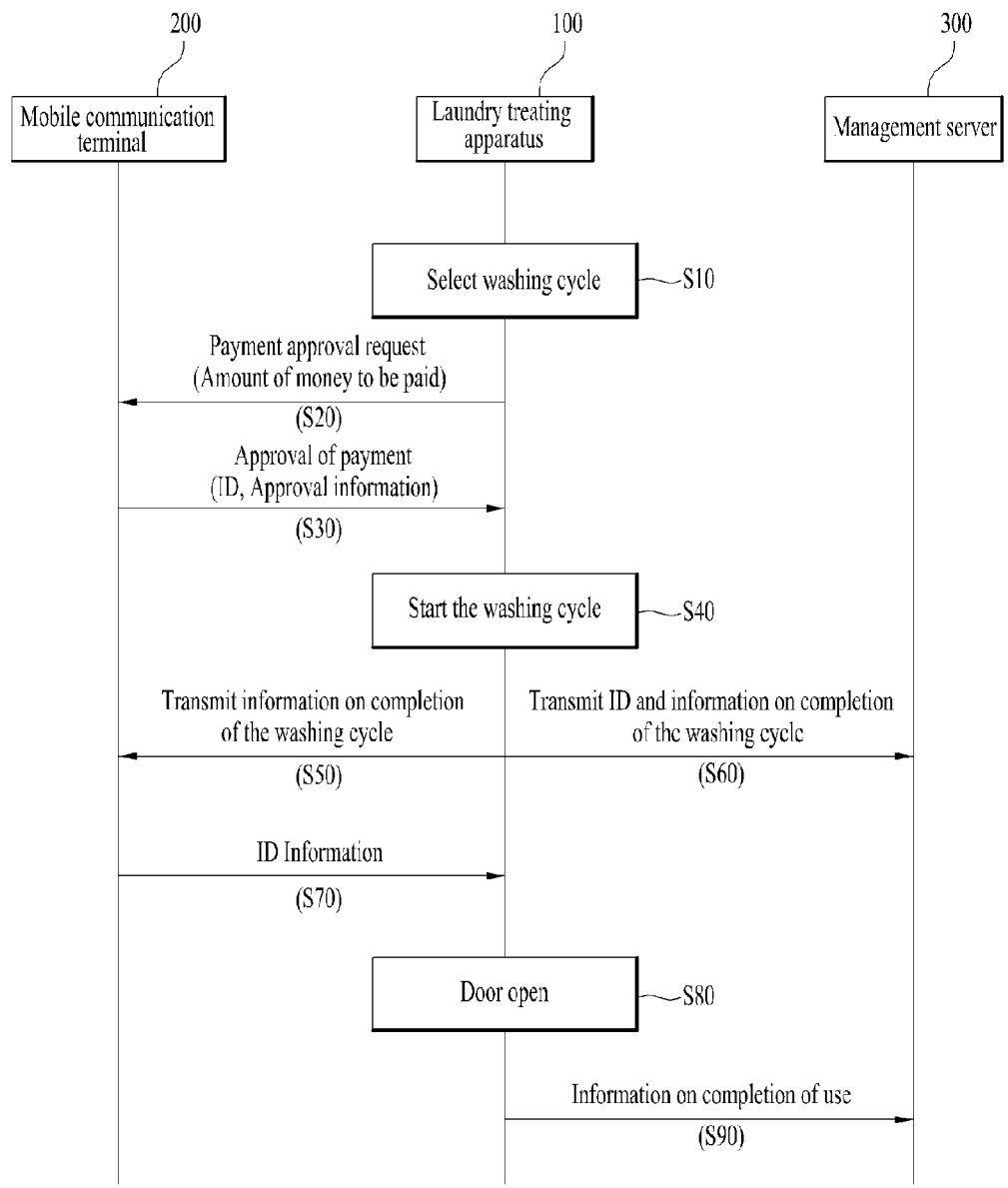
[Fig. 4]

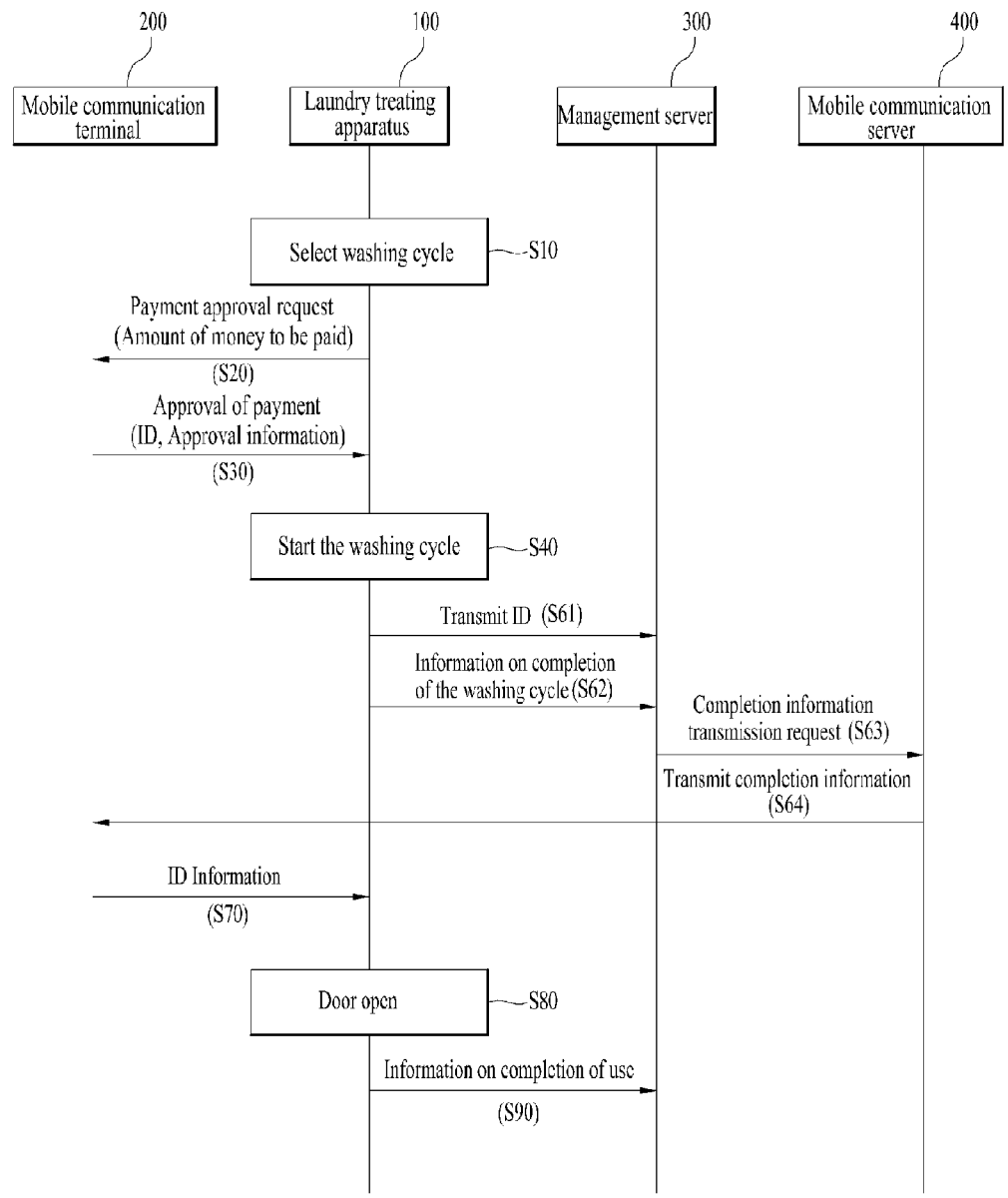

LAUNDRY TREATING APPARATUS AND METHOD FOR CONTROLLING THE SAME

CROSS REFERENCE TO RELATED APPLICATION

This application claims the benefit of the Patent Korean Application No. 10-2012-0105231, filed on Sep. 21, 2012, which is hereby incorporated by reference as if fully set forth herein.

BACKGROUND OF THE DISCLOSURE

Field of the Disclosure

The present invention relates to a laundry treating apparatus and a method for controlling the same, and more particularly, to an apparatus for washing or drying laundry and a method for controlling the same.

Discussion of the Related Art

The laundry treating apparatus may include a washing machine having a washing function, a dryer having a drying function, and a washing machine having a drying function, entirely.

In general, though the laundry treating apparatus is installed at a home for use therein, the laundry treating apparatus may be installed at a coin laundry in which a plurality of the laundry treating apparatus are provided to a place for renting the laundry treating apparatus temporarily as a business.

If the laundry treating apparatus is installed at the coin laundry, a user may use the laundry treating apparatus for a certain amount of money paid, and collect the laundry after use of the laundry treating apparatus is finished. In a case the laundry treating apparatus is used at the coin laundry, in general, the money is paid in cash.

However, since the cash payment requires the user to have small changes always, a coin laundry manager has an additional burden of installing a coin changer at the coin laundry for the users who have no small changes.

Moreover, since a plurality of users use the coin laundry, the coin laundry has risks of lost laundry and being a victim of theft. That is, there is a problem in that the user is required to stay at the coin laundry until a washing cycle of the laundry treating apparatus is finished for preventing the lost laundry and being a victim of theft from taking place.

SUMMARY OF THE DISCLOSURE

To solve the problems, an object of the present invention is to provide a laundry treating apparatus which enables to settle payment without cash, simply; and a method for controlling the same.

Another object of the present invention is to provide a laundry treating apparatus which can prevent risks of lost laundry and being a victim of theft from taking place even if a plurality of users use the laundry treating apparatus; and a method for controlling the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laundry treating apparatus includes a cabinet, an accommodating unit within the cabinet to hold laundry a door provided on one face of the cabinet to access the accommodating unit, a control panel to receive a washing cycle control order, and a first communication module to communicate with a mobile communication terminal through a local area network to receive ID information.

And, the laundry treating apparatus may include second communication module to communicate with a management server through a communication network.

In this case, the second communication module may transmit to the management server at least one of the ID information and the received information on completion of the washing cycle.

The first communication module may transmit to the mobile communication terminal at least one of information on a payment approval request and information on completion of the washing cycle.

The first communication module may receive from the mobile communication terminal at least one of information on payment approval and ID information.

And, the laundry treating apparatus may further include a storage unit for storing the ID information transmitted from the mobile communication terminal.

In this case, the door may be unlocked if the ID information stored in the storage unit and the ID information received from a specific mobile communication terminal are the same.

In the meantime, the first communication module may include a Near Field Communication Near Field Communication (NFC) chip.

In another aspect of the present invention, a method for controlling a laundry treating apparatus includes the steps of receiving a washing cycle control order, transmitting information on a payment approval request to a mobile communication terminal, receiving, from the mobile communication terminal, ID information to identify the mobile communication terminal and information on payment approval, storing the ID information received from the mobile communication terminal, and performing the received washing cycle based upon the information on the payment approval.

In this case, the information on a payment approval request may include information regarding an amount of money to be paid.

And, the information on a payment approval request may further include at least one of identification information of the laundry treating apparatus and identification information of a coin laundry having the laundry treating apparatus installed therein.

Along with this, it is preferable that the amount of money to be paid is differentially calculated according to at least one of a washing cycle selected and a weight of the laundry.

In the meantime, the information on payment approval may include ID information to identify the mobile communication terminal and the payment approval.

And, the method may further include transmitting information on completion of the washing cycle to the mobile communication terminal.

The information on completion of the washing cycle includes at least one of a completion time of the washing cycle, a total cycle time period, a remaining time period of the washing cycle, and whether the washing cycle is finished or not.

It is preferable that The information on completion of the washing cycle is transmitted at least one of right before starting, at the same time as starting, right after starting, during progress, and right after completion of the washing cycle.

In the meantime, the method may further include storing the ID information received from the mobile communication terminal.

And, the method may further include receiving the ID information from the mobile communication terminal and unlocking the door if the ID information received is the same as the stored ID information.

In this case, it is preferable that unlocking the door is performed after finishing the washing cycle.

It is preferable that the method may further include transmitting the ID information on the mobile communication terminal to a management server after reception of the information on the payment approval.

In the meantime, the method may further include transmitting, to the management server, information on completion of use if the washing cycle is finished.

It is preferable that the communication between the mobile communication terminal and the laundry treating apparatus is made through a local area network.

In this case, it is preferable that the local area network is a Near Field Communication (NFC).

In another aspect of the present invention, a method for controlling a laundry treating apparatus includes receiving first ID information from the mobile communication terminal, storing the first ID information, receiving second ID information from the mobile communication terminal, and unlocking a door if the first ID information and the second ID information are the same.

In this case, it is preferable that the first ID information and the second ID information are received through a wireless local area network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 illustrates a schematic view of an outline of a laundry treating system in accordance with a preferred embodiment of the present invention.

FIG. 2 illustrates a schematic view of a laundry treating apparatus in a laundry treating system in accordance with a preferred embodiment of the present invention.

FIG. 3 illustrates a block diagram of a laundry treating system in accordance with a preferred embodiment of the present invention.

FIG. 4 illustrates a flow chart showing the steps of a method for controlling a laundry treating apparatus in accordance with a preferred embodiment of the present invention.

FIG. 5 illustrates a flow chart showing the steps of a method for controlling a laundry treating apparatus in accordance with another preferred embodiment of the present invention.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

The laundry treating apparatus of the present invention may include a washing machine having a washing function, a dryer having a drying function, and a washing machine having the drying function, entirely. And, the laundry treating apparatus also includes both a top loading type in which the laundry is introduced to the laundry treating apparatus through a top of a cabinet, and a front loading type in which the laundry is introduced to the laundry treating apparatus through a front of the cabinet. And, if the laundry treating apparatus is the dryer, the laundry treating apparatus includes a dryer for drying the laundry by a rotating drum, and a cabinet type dryer which dries the laundry by hanging in the cabinet without the drum provided thereto.

Referring to FIG. 1, the laundry treating system in accordance with a preferred embodiment of the present invention may include a mobile communication terminal 200 for exchange of information with the laundry treating apparatus 100 through a wireless local area network, and a management server 300 for exchanging information with the laundry treating apparatus 100 through a communication network.

The laundry treating apparatus 100 which is an apparatus for washing or drying a washing object may be installed at a home or at a place of business which takes profits by managing the laundry treating apparatus 100. In this case, the place of business may be a coin laundry for temporary renting of the laundry treating apparatus installed thereto to a user for a fee received from the user. The management server 300 is a device for managing a plurality of sets of the laundry treating apparatuses installed at the coin laundry by a manager of the coin laundry. The manager may identify a used state, a completion time of the use, and a fee for the use of each of the plurality of laundry treating apparatuses with the management server 300.

The mobile communication terminal 200 may be a cellular phone, or a PDA, or a smart phone of which trend of use increases sharply, recently.

Referring to FIG. 1, the laundry treating apparatus, the mobile communication terminal and the management server may transmit or receive information through the communication network.

FIG. 2 illustrates a schematic view of a laundry treating apparatus 100 in a laundry treating system in accordance with a preferred embodiment of the present invention.

Referring to FIG. 2, the laundry treating apparatus 100 includes a cabinet 110 which forms an exterior appearance of the laundry treating apparatus having a laundry introduction opening in a front for in/out of the laundry there through, a laundry accommodating unit in the cabinet 110 for holding the laundry, and a tub (Not shown) in the cabinet 110 for holding washing water. The laundry holding unit may be a drum 120 rotatably provided to an inside of the tub. The laundry treating apparatus also includes a control unit 160 (see FIG. 3) for controlling drive of the laundry treating apparatus 100. In this case, since the tub and the drum 120 are known elements of the laundry treating apparatus, detailed description of which will be omitted.

The cabinet 110 forms a space for housing the tub and the drum 120 therein. And, the cabinet 110 has the front having the introduction opening formed therein in communication with an inside of the drum for in/out of the laundry there through. And, the cabinet 110 has the front having a door 115 provided thereto. The door 115 is mounted to enable to open/close the introduction opening.

In the meantime, there is a control panel 130 provided to the front of the cabinet 110 for user's application of a washing cycle thereto. The user may apply a control order to the laundry treating apparatus through the control panel 130. The control panel may have a course selection unit, a condition selection unit, and a display unit, a power source unit.

The control unit 160 controls a motor, a water supply/discharge valve and a washing cycle of the laundry treating apparatus according to a drive condition of a washing course.

Moreover, the laundry treating apparatus 100 may include a first communication module 140 to communicate with the mobile communication terminal 200. In this case, the first communication module 140 may communicate with the mobile communication terminal 200 through the local area network. Along with this, the laundry treating apparatus 100 may include a second communication module 150 to communicate with the management server 300. And, the laundry treating apparatus 100 may include a storage unit 140 for storing ID information on the mobile communication terminal 200. (See FIG. 3)

Referring to FIG. 3, the mobile communication terminal 200 may include a wireless local area communication unit 210, an input unit 220 for having payment approval applied thereto from the user, and a display 230 for displaying information on completion of the washing cycle including payment information, information on a completion time of the washing cycle, and so on thereon.

The wireless local area communication unit 210 serves to receive information from the first communication module 140 in the laundry treating apparatus 100 by using the local area network, or to transmit information to the first communication module 140. The wireless local area communication unit 210 and the first communication module 140 may communicate by using a local area communication technology. In this case, the local area communication may be a contactless radio communication, such as RFID (Radio Frequency Identification), NFC(Near Field Communication) or Bluetooth, and preferably the NFC. If the local area communication is the NFC, the first communication module includes a NFC chip. The NFC uses a frequency of 13.56 MHz band and is able to transmit a data at low power within a 10 cm distance.

The NFC used as the local communication technology has an advantage of enhancing security compared to other communication technologies when the fee for using the laundry treating apparatus is paid, and an advantage of making either-way communication possible since reading and writing is possible in the NFC.

The laundry treating apparatus 100 includes the first communication module 140 which communicates with the wireless local area communication unit 210 of the mobile communication terminal 200. In this case, the first communication module 140 may include a NFC chip. And, the laundry treating apparatus 100 may include the second communication module 150 which communicates with the management server 300. The laundry treating apparatus 100 may also include the storage unit 140 for storing user information from the mobile communication terminal 200 therein. In this case, the user information may be ID information on the mobile communication terminal. The first communication module 140 is provided to one side of the cabinet 110 of the laundry treating apparatus, and preferably to one side of the control panel 130. The first communication module 140 transmits at least one of a payment approval request and a washing completion time to the mobile communication terminal 200. And, the second communication module 150 transmits at least one of the ID information on the mobile communication terminal 200 and information on completion of the washing cycle received thus to the management server 300. And, the first communication module 140 receives at least one of the payment approvals from the mobile communication terminal 200 and the ID information on the mobile communication terminal 200. In the meantime, the control unit 160 of the laundry treating apparatus 100 unlocks the door 115 if the ID information stored in the storage unit 170 and the ID information received from the mobile communication terminal 200 is the same.

The second communication module 150 may communicate with the management server 300 by using a wireless/wired communication network. State information on the laundry treating apparatus 100 may be transmitted to the management server 300 through the second communication module 150.

The management server 300 manages the laundry treating apparatuses 100 installed at a fixed place. The management server 300 performs a function of receiving information on a used state, a finished time, a paid amount of money and so on from the plurality of laundry treating apparatuses, and providing the information received thus to the manager. The management server 300 may include a communication unit 310 to communicate with the laundry treating apparatus 100, and a display unit 320 for displaying a current situation of the laundry treating apparatus to the manager.

The manager can manage and monitor the current situation, and the like of the laundry treating apparatuses installed at the coin laundry with the management server 300, collectively.

A method for controlling a laundry treating apparatus in accordance with a preferred embodiment of the present invention will be described with reference to FIG. 4.

The method for controlling a laundry treating apparatus in accordance with a preferred embodiment of the present invention may include a step S10 of receiving a washing cycle from the user, a step S20 for transmitting information on a payment approval request to a mobile communication terminal 200, a step S30 of receiving information on payment approval from the mobile communication terminal 200, and a step S40 of performing a washing cycle received as the payment approval is done.

The user selects one of the plurality of laundry treating apparatuses which are not in use in the coin laundry. Then, after introducing laundry to a drum 120 through a laundry introduction opening in the laundry treating apparatus 100 selected thus, the user closes a door 115. Then, the user selects a desired washing cycle at a control panel 130 (S10). That is, the laundry treating apparatus 100 has the washing cycle applied thereto from the user. In this case, the washing cycle includes at least one of a cycle for washing the laundry and a cycle for drying the laundry. That is, the user may select both the washing cycle and the drying cycle or either the washing cycle or the drying cycle.

Upon completion user's washing cycle selection, the user positions a user's mobile communication terminal 200 close to the first communication module 140 provided to one side of the control panel 130. When the mobile communication terminal 200 is positioned close to the first communication module 140, payment approval request information is transmitted from the laundry treating apparatus 100 to the mobile communication terminal 200 through a local area network (S20). The information on the payment approval request may include at least one of information on an amount of money to be paid, identification information on the laundry treating apparatus, and identification information on the coin laundry having the laundry installed thereto.

In more detail, upon completion user's washing cycle selection, the laundry treating apparatus 100 transmits the information on the payment approval request including the information on the amount of money to be paid required for using the laundry treating apparatus to the mobile communication terminal 200. The transmission of the information on the payment approval request may be performed by the first communication module 140 provided to the laundry treating apparatus 100. That is, the first communication module 140 may transmit the information on the payment approval request to the wireless local area communication unit 210 of the mobile communication terminal 200 by using a local area communication technology. The information on the payment approval request may include information regarding an amount of money to be paid, along with the identification information on the coin laundry which enables to identify the coin laundry. The identification information on the coin laundry may be used in a payment step to be performed, later. And, the information on the payment approval request may include identification information on the laundry treating apparatus. It is preferable that the identification information transmitted to the mobile communication terminal 200 thus is stored in a memory of the mobile communication terminal 200 so that the user can find the laundry treating apparatus with reference to the information on the identification number after completion of the washing, easily.

The laundry treating apparatus may calculate the amount of money to be paid according to at least one of a washing cycle selected and a weight of the laundry, differentially. Preferably, both the washing cycle, and the weight of the laundry are used as references for the calculation. If the user selects both the washing cycle and the drying cycle, an A amount of money may be calculated as the amount of money to be paid, and, if the user selects the washing cycle, a B amount of money may be calculated as the amount of money to be paid. In this case, it is preferable that the A amount of money is higher than the B amount of money. Or, the amount of money to be paid may be calculated according to the weight of the laundry, differentially. The amount of money to be charged may be the higher as the weight of the laundry is the heavier. The weight of the laundry may be calculated by using a rotation speed of the drum of the laundry treating apparatus. Since a technology for calculation of the weight of the laundry is known, detailed description will be omitted.

The mobile communication terminal 200 receives the information on the payment approval request transmitted from the laundry treating apparatus 100. In this case, the reception of the information on the payment approval request is made by the wireless local area communication unit 210 of the mobile communication terminal 200.

The mobile communication terminal 200 receives the information on the payment approval request and displays the same on a display 230 of the mobile communication terminal 200. The display 230 displays the amount of money to be paid and may display a chat window asking whether the payment is to be proceeded or not.

If the user wants to pay, the user applies the payment approval to the input unit 220 of the mobile communication terminal 200. Upon reception of the payment approval from the user, payment on the amount of money to be paid is performed. The payment on the amount of money to be paid may be carried out in a variety of methods. As an example, if a USIM chip (Universal Subscriber Identity Module Chip) of the mobile communication terminal has mobile money, the payment may be performed in a mode in which the mobile money is reduced as much as the amount of money to be paid. Or, upon the payment approval is made, the mobile communication terminal 200 transmits the information on the payment approval to a server of a mobile telecommunication company, and the mobile telecommunication company may charge the amount of money to be paid added to a communication fee, later. Or, if the mobile communication terminal 200 has a mobile credit card stored therein, the payment may be made with the mobile credit card. In the present invention, the payment may be made with one of known payment methods by using the mobile communication terminal 200, and, preferably, may be charged together with the communication fee to the mobile communication terminal.

When the user inputs the payment approval, the mobile communication terminal 200 transmits the payment approval information to the laundry treating apparatus 100 (S30). In this case, the payment approval information transmitted to the laundry treating apparatus 100 may include the ID information which enables to identify the mobile communication terminal 200 of the user, and information on the payment approval which approves the payment. The ID information for identifying the mobile communication terminal 200 is identification information which does not duplicate with other mobile communication terminals. The ID information may be at least one of a telephone number of the mobile communication terminal 200, USIM information, and information on personal subscription to an application only for payment to the coin laundry. However, the ID information is not limited to this, but may be any information as far as the information enables to identify the user. The ID information on the mobile communication terminal transmitted to the laundry treating apparatus 100 thus is stored in the storage unit 140 of the laundry treating apparatus 100. The ID information stored thus is used for identification of the user when the user collects the laundry after finishing the washing cycle.

Upon reception of the information on the payment approval from the mobile communication terminal 200, the laundry treating apparatus 100 performs the washing cycle selected thus (S40). Along with this, the laundry treating apparatus 100 transmits the information on completion of the washing cycle to the mobile communication terminal 200 by using the local area network (S50). Along with this, the laundry treating apparatus 100 transmits the ID information on the mobile communication terminal 200 and the information on completion of the washing cycle to the management server 300 (S60). In this case, the information on completion of the washing cycle may be at least one of a finish time of the washing cycle, a total cycle time period required until the washing cycle is finished, and a remained time period until the washing cycle is finished, and preferably, includes the finish time, and the total cycle time period of the washing cycle. For an example, if the time period required for the washing cycle of the laundry treating apparatus 100 is 2 hours, and a starting time of the washing cycle is 2 PM, the laundry treating apparatus 100 may transmit the 2 hours which is a required time period for the washing cycle, or 4 PM which is the finish time of the washing cycle to the mobile communication terminal.

The laundry treating apparatus 100 transmits the information on completion of the washing cycle to the mobile communication terminal 200 through the first communication module 140, and the information on completion of the washing cycle transmitted thus is received by the mobile communication terminal 200 at the wireless local area communication unit 210. The user may notice the finish time of the washing cycle of the laundry treating apparatus 100 through the information on completion of the washing cycle received thus. Accordingly, the user is able to take care of another business without limitation of space until the finish time of the washing cycle. The user may return to the coin laundry meeting the finish time of the washing cycle received thus in middle of taking care of another business and collect the laundry of which washing is finished.

In the meantime, if the mobile communication terminal 200 is a smart phone, it is preferable that the mobile communication terminal 200 has the application only for payment of the coin laundry installed thereto. Upon reception of the payment approval request from the laundry treating apparatus 100, the application may display a payment frame to the user, and perform a series of payment process described before. And, upon reception of the finish time of the washing cycle from the laundry treating apparatus 100, the mobile communication terminal 200 may set alarm matched to the finish time of the washing cycle. Accordingly, the user can notice the finish of the washing cycle with the alarm matched to the finish time of the washing cycle.

Upon reception of the information on the payment approval from the mobile communication terminal 200, the laundry treating apparatus 100 transmits the information on the payment approval to the management server 300 (S60). The management server 300 revises the current situation of the laundry treating apparatus according to the information on the payment approval received thus. That is, upon reception of the information on payment approval from the laundry treating apparatus 100, the management server 300 may display the current situation of the laundry treating apparatus as 'In Use' on the display unit 320, and display the finish time of the washing cycle and the remaining time period of the washing cycle. The manager may manage the coin laundry with reference to the finish time of the washing cycle displayed on the display unit 320, effectively. For an example, the manager may inform a schedule of the laundry treating apparatus to clients by using the finish time of the washing cycle displayed thus. And, the manager may manage daily sales by using the amount of money paid included to the information on the payment approval with a computer easily, to provide an advantage in that no one by one input of the sales amount is required.

In the meantime, though FIG. 4 illustrates transmission of the information on the completion of the washing cycle to the mobile communication terminal 200 and/or the management server 300 after the washing cycle is started (S40), a time of the transmission of the information on the completion of the washing cycle to the mobile communication terminal 200 and/or the management server 300 is not limited to this without fail, but the time of the transmission of the information on the completion of the washing cycle to the mobile communication terminal 200 and/or the management server 300 may be after transmission of the information on the payment approval to the laundry treating apparatus 100 from the mobile communication terminal 200 (S30) or at the same time with the start of the washing cycle (S40). That is, the transmission (S50), (S60) of the information on the completion of the washing cycle may be made between, or at the same time with, the transmission of the information on the payment approval (S30) and the start of the washing cycle (S40).

In the meantime, the user may unlock the door 115 by transmission of the ID information on the mobile communication terminal 200 to the laundry treating apparatus 100 (S80). In this case, it is preferable that the step of unlocking the door 115 is performed after the washing cycle is finished. That is, by transmission of the ID information on the mobile communication terminal 200 to the laundry treating apparatus 100 after completion the washing cycle, the user may unlock the door 115. Specifically, by bringing the mobile communication terminal 200 close to the first communication module 140 of the laundry treating apparatus 100, the user may transmit the ID information on the mobile communication terminal 200 to the laundry treating apparatus 100. If the ID information stored in the storage unit 140 is the same with the ID information received thus, the laundry treating apparatus 100 unlocks the door 115 (S80).

When the door 115 is unlocked, the user opens the door to take out the laundry from an inside of the drum 120. Along with this, when the user takes out the laundry from the laundry treating apparatus 100 as the ID information is received, the laundry treating apparatus 100 transmits information on completion of use to the management server 300 (S90). The management server 300 may revise the current situation of the laundry treating apparatus to 'completion of use' according to the information on completion of use.

A method for controlling a laundry treating apparatus in accordance with another preferred embodiment of the present invention will be described, with reference to FIG. 5.

The user selects one of the plurality of laundry treating apparatuses which are not in use in the coin laundry. After introducing laundry to a drum 120 through a laundry introduction opening in the laundry treating apparatus 100 selected thus, the user closes a door 115. Then, the user selects a desired washing cycle at a control panel 130 (S10). That is, the laundry treating apparatus 100 receives the washing cycle from the user. In this case, the washing cycle includes at least one of a cycle for washing the laundry and a cycle for drying the laundry. That is, the user may select both the washing cycle and the drying cycle, or either the washing cycle or the drying cycle.

Upon completion of user's washing cycle selection, the user positions a user's mobile communication terminal 200 close to the first communication module 140 provided to one side of the control panel 130. When the mobile communication terminal 200 is positioned close to the first communication module 140, information on payment approval request is transmitted from the laundry treating apparatus 100 to the mobile communication terminal 200 through a local area network (S20).

In more detail, upon completion of user's washing cycle selection, the laundry treating apparatus 100 transmits the information on the payment approval request including the information on the amount of money to be paid required for using the laundry treating apparatus to the mobile communication terminal 200. The transmission of the information on the payment approval request may be performed by the first communication module 140 provided to the laundry treating apparatus 100. That is, the first communication module 140 may transmit the information on the payment approval request to the wireless local area communication unit 210 of the mobile communication terminal 200 by using a local area communication technology. The information on the payment approval request may include information on an amount of money to be paid, along with the identification information on the coin laundry which enables to identify the coin laundry. The identification information on the coin laundry may be used in a payment step to be performed, later. And, the information on the payment approval request may include information on an identification number of the laundry treating apparatus. It is preferable that the information on the identification number is stored in a memory of the mobile communication terminal 200 so that the user can find the laundry treating apparatus with reference to the information on the identification number after finish of the washing, easily.

The laundry treating apparatus may calculate the amount of money to be paid according to the washing cycle selected thus, differentially. Since this is the same with the embodiment described with reference to FIG. 4, detailed description will be omitted.

The mobile communication terminal 200 receives the information on the payment approval request transmitted from the laundry treating apparatus 100. In this case, the reception of the information on the payment approval request is made by the wireless local area communication unit 210 of the mobile communication terminal 200.

The mobile communication terminal 200 receives the information on the payment approval request and displays the same on a display 230 of the mobile communication terminal 200. The display 230 displays the amount of money to be paid and may display a chat window asking whether the payment is to be proceeded or not.

If the user wants to pay, the user applies the payment approval to the input unit 220 of the mobile communication terminal 200. Upon reception of the payment approval from the user, payment on the amount of money to be paid is performed. The payment on the amount of money to be paid may be carried out in a variety of methods. As an example, if a USIM chip (Universal Subscriber Identity Module Chip) of the mobile communication terminal has mobile money, the payment may be performed in a mode in which the mobile money is reduced as much as the amount of money to be paid. Or, upon the payment approval is made, the mobile communication terminal 200 transmits the information on the payment approval to a server of a mobile telecommunication company, and the mobile telecommunication company may charge the amount of money to be paid added to a communication fee, later. Or, if the mobile communication terminal 200 has a mobile credit card stored therein, the payment may be made with the mobile credit card. In the present invention, the payment may be made with one of known payment methods by using the mobile communication terminal 200, and, preferably, may be charged together with the communication fee to the mobile communication terminal.

When the user inputs the payment approval, the mobile communication terminal 200 transmits the payment approval information to the laundry treating apparatus 100 (S30). That is, the wireless local area communication unit 210 of the mobile communication unit 200 transmits the information on the payment approval to the first communication module 140 of the laundry treating apparatus 100. In this case, the information on payment approval transmitted to the laundry treating apparatus 100 may include the ID information which enables to identify the mobile communication terminal 200 of the user, and information on approval of the payment which approves the payment. The ID information for identifying the mobile communication terminal 200 is identification information which does not duplicate with other mobile communication terminals. The ID information may be a telephone number of the mobile communication terminal 200. The ID information on the mobile communication terminal transmitted to the laundry treating apparatus 100 thus is stored in the storage unit 140 of the laundry treating apparatus 100. The ID information stored thus is used for identification of the user when the user collects the laundry after completion the washing cycle.

Upon reception of the information on the payment approval from the mobile communication terminal 200, the laundry treating apparatus 100 performs the washing cycle selected thus (S40). Along with this, the laundry treating apparatus 100 may transmit the information on completion of the washing cycle related to finish of the washing cycle of the laundry treating apparatus 100 to the mobile communication terminal. A step for transmission of the information on completion of the washing cycle will be described, later. And, the laundry treating apparatus 100 may transmit the ID information on the mobile communication terminal 200 to the management server 300. The information on completion of the washing cycle may include at least one of a finish time of the washing cycle, a total cycle time period required until the washing cycle is finished, a remaining time period until the washing cycle is finished, and whether the washing cycle is finished or not.

Upon reception of the information on payment approval from the mobile communication terminal 200, the laundry treating apparatus 100 transmits the information on payment approval to the management server (S61). The management server 300 revises the current situation of the laundry treating apparatus according to the information on payment approval received thus. That is, upon reception of the information on payment approval from the laundry treating apparatus 100, the management server 300 may display the current situation of the laundry treating apparatus as 'In Use' on the display unit 320 by using the identification information on the laundry treating apparatus 100 included to the information on the payment approval, and display the finish time of the washing cycle of the laundry treating apparatus. The manager may manage the coin laundry with reference to the finish time of the washing cycle displayed on the display unit 320, effectively. For an example, the manager may inform a schedule of the laundry treating apparatus to clients by using the finish time of the washing cycle displayed thus. And, the manager may manage daily sales by using the amount of money paid included to the information on the payment approval with a computer easily, to provide an advantage in that no one by one input of the sales amount is required.

Hereafter, a process for transmitting information on completion of the washing cycle to the mobile communication terminal 200 will described.

The laundry treating apparatus 100 may transmit the information on completion of the washing cycle to the mobile communication terminal 200 through the management server 300.

In detail, the laundry treating apparatus 100 may transmit the information on completion of the washing cycle to the management server 300 through the second communication module 150 (S62). The management server 300 transmits a transmission request on information on completion of the washing cycle to a mobile communication server 400 (S63). The mobile communication server 400 may be managed by a mobile telecommunication company which maintains and manages a network of the mobile communication terminals. Upon reception of the transmission request on information on completion of the washing cycle from the management server 300, the mobile communication server 400 transmits the information on completion of the washing cycle received thus to the mobile communication terminal 200 of the user through the mobile communication network (S64). The information on completion of the washing cycle may be transmitted in a mode of, but not limited to, an SMS (Short Message Service). However, the information on completion of the washing cycle may be transmitted in a mode of a mobile instant message. If transmitted in the mobile instant message, the information on completion of the washing cycle may be transmitted to the mobile communication terminal 200 through the Internet, which has advantages of saving an SMS charge to be paid to the mobile telecommunication company, and transmitting the information not through the mobile communication server 400 of the mobile telecommunication company.

In the meantime, it is preferable that a time point the information on completion of the washing cycle is transmitted to the mobile communication terminal 200 is after starting of the washing cycle. In this case, the time point the information on completion of the washing cycle is transmitted to the mobile communication terminal 200 may be at least one of in progress of the washing cycle and after completion of the washing cycle after reception of the information on the payment approval, and preferably, includes right after starting, during progress, and after completion of the washing cycle, entirely. In this case, in detail, if the time point the information on completion of the washing cycle is transmitted is after reception of the information on payment approval, the time point the information on completion of the washing cycle may be transmitted right before, at the same cycle time with, or right after, the starting of the washing cycle. Hereinafter, the case when the information on completion of the washing cycle is transmitted right after the starting of the washing cycle may also be applicable to cases when the information on completion of the washing cycle is transmitted right before, and at the same time with, the starting of the washing cycle.

The case when the time point the information on completion of the washing cycle is transmitted is right after the starting of the washing cycle, it is preferable that the information on completion of the washing cycle includes at least one of information on the finish time of the washing cycle, and information on the total cycle time period of the laundry treating apparatus 100. Accordingly, the user may notice the finish time of the washing cycle of the laundry treating apparatus 100 with reference to the information on completion of the washing cycle received thus. Accordingly, the user is able to take care of another business without limitation of space until the finish time of the washing cycle. The user may return to the coin laundry meeting the finish time of the washing cycle received thus in middle of taking care of another business and collect the laundry of which washing is finished.

If the time point the information on completion of the washing cycle is transmitted is in progress of the washing cycle, the information on completion of the washing cycle may include information on the remaining time period of the washing cycle of the laundry treating apparatus. Accordingly, the user may adjust a time when the user returns to the coin laundry with reference to the remaining time period of the washing cycle included to the information on completion of the washing cycle received thus. In this case, the information on completion of the washing cycle including the information on the remaining time period of the washing cycle of the laundry treating apparatus may be transmitted more than once before the washing cycle is finished. Preferably, the information on completion of the washing cycle may be transmitted at fixed time intervals (30 minutes, or one hour). This is because the total cycle time period of the washing cycle set initially may vary with a water pressure of a water supply source, or an external environment while the washing cycle is in progress, or the remaining time period of the washing cycle transmitted already may vary while the washing cycle in progress.

If the time point the information on completion of the washing cycle is transmitted is after finish of the washing cycle, the information on completion of the washing cycle may include information on completion of the washing cycle of the laundry treating apparatus. The user may return to the coin laundry upon noticing completion of the washing cycle of the laundry treating apparatus with reference to the information on completion of the washing cycle received thus.

A case the information on completion of the washing cycle is transmitted to the mobile communication terminal 200 through the mobile communication network or the Internet has an advantage in that the mobile communication terminal 200 is not required to have an additional exclusive application provided thereto.

In the meantime, the user may transmit the ID information on the mobile communication terminal 200 to the laundry treating apparatus 100 to unlock the door 115 (S80). In this case, it is preferable that the door 115 unlocking step is performed after finish of the washing cycle. That is, after finish of the washing cycle, the user may transmit the ID information on the mobile communication terminal 200 to the laundry treating apparatus 100 to unlock the door 115. Specifically, the user may transmit the ID information of the mobile communication terminal 200 to the laundry treating apparatus 100 by positioning the mobile communication terminal 200 close to the first communication module 140 of the laundry treating apparatus 100. If the ID information stored in the storage unit 140 of the laundry treating apparatus 100 is the same with the ID information received thus, the laundry treating apparatus 100 unlocks the door 115 (S80).

If the door 115 is unlocked, the user may open the door and take out the laundry from an inside of the drum 120. Along with this, if the user takes out the laundry from the laundry treating apparatus 100 as the ID information is received at the laundry treating apparatus 100, the laundry treating apparatus 100 transmits information on completion of use to the management server 300 (S90). The management server 300 may revise the current situation of the laundry treating apparatus to 'finish of use' according to the information on completion of use.

As have been described, the laundry treating apparatus and the method for controlling the same of the present invention have the following advantages.

Money can be paid without cash if the user uses the laundry treating apparatus installed at the coin laundry.

The risk of losing the laundry can be prevented even if a plurality of users use the laundry treating apparatus.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A laundry treating apparatus comprising:
   a cabinet;
   an accommodating unit within the cabinet to hold laundry;
   a door provided on one face of the cabinet to access the accommodating unit;
   a control panel to receive a washing cycle control order;
   a first communication module to communicate with a mobile communication terminal through a local area network to receive ID information; and a second communication module to communicate directly with a management server,
wherein the second communication module transmits to the management server the received ID information and an information on completion of the washing cycle,
wherein the management server transmits the information on completion of the washing cycle to a mobile communication server, and the mobile communication server transmits the information on completion of the washing cycle to the mobile communication terminal of the user through a mobile communication network.

2. The laundry treating apparatus of claim 1, wherein the management server transmits information on completion of the washing cycle to the mobile communication terminal.

3. The laundry treating apparatus of claim 1, wherein the first communication module transmits to the mobile communication terminal at least one of information on a payment approval request and information on completion of the washing cycle.

4. The laundry treating apparatus of claim 1, wherein the first communication module receives from the mobile communication terminal at least one of information on payment approval and ID information.

5. The laundry treating apparatus of claim 1, further comprising:
a storage unit for storing the ID information transmitted from the mobile communication terminal.

6. The laundry treating apparatus of claim 5, wherein the door is unlocked if the ID information stored in the storage unit and the ID information received from a specific mobile communication terminal are the same.

7. The laundry treating apparatus of claim 1, wherein the first communication module includes a Near Field Communication (NFC) chip.

8. The method of claim 2, wherein the information on completion of the washing cycle is transmitted in a mode of a mobile instant message.

9. The laundry treating apparatus of claim 1, wherein if a time that the information on completion of the washing cycle is transmitted to the mobile communication terminal is after starting of the washing cycle, the information on completion of the washing cycle includes at least one of information on the finish time of the washing cycle and information on the total cycle time period of the laundry treating apparatus.

10. The laundry treating apparatus of claim 1, wherein if a time that the information on completion of the washing cycle is transmitted to the mobile communication terminal is in progress of the washing cycle, the information on completion of the washing cycle includes information on the remaining time period of the washing cycle of the laundry treating apparatus.

11. The laundry treating apparatus of claim 1, wherein a time that the information on completion of the washing cycle is transmitted to the mobile communication terminal is after finish of the washing cycle, the information on completion of the washing cycle includes information on finish of the washing cycle of the laundry treating apparatus.

12. A method for controlling a laundry treating apparatus comprising:
receiving a washing cycle control order;
transmitting information on a payment approval request to a mobile communication terminal;
receiving, from the mobile communication terminal, ID information to identify the mobile communication terminal and information on payment approval;
storing the ID information received from the mobile communication terminal;
performing the received washing cycle based upon the information on the payment approval; and
finishing the washing cycle, and
wherein the method for controlling a laundry treating apparatus further comprises transmitting information on completion of the washing cycle directly to a management sever,
wherein the management server transmits the information on completion of the washing cycle to a mobile communication server, and the mobile communication server transmits the information on completion of the washing cycle to the mobile communication terminal of the user through a mobile communication network.

13. The method of claim 12, wherein the information on a payment approval request includes information regarding an amount of money to be paid.

14. The method of claim 13, wherein the information on a payment approval request further includes at least one of identification information of the laundry treating apparatus and identification information of a coin laundry having the laundry treating apparatus installed therein.

15. The method of claim 13, wherein the amount of money to be paid is differentially calculated according to at least one of a washing cycle selected and a weight of the laundry.

16. The method of claim 12, wherein the information on completion of the washing cycle includes at least one of a finish time of the washing cycle, a total cycle time period, a remaining time period of the washing cycle, and whether the washing cycle is finished or not.

17. The method of claim 12, wherein the information on completion of the washing cycle is transmitted at least one of right before starting, at the same time as starting, right after starting, during progress, and right after completion of the washing cycle.

18. The method of claim 12, further comprising:
receiving the ID information from the mobile communication terminal and unlocking the door if the ID information received is the same as the stored ID information.

19. The method of claim 18, wherein unlocking the door is performed after finishing the washing cycle.

20. The method of claim 12, further comprising:
transmitting the ID information on the mobile communication terminal to a management server after reception of the information on the payment approval.

21. The method of claim 12, wherein the communication between the mobile communication terminal and the laundry treating apparatus is made through a local area network.

22. The method of claim 21, wherein the local area network is a Near Field Communication (NFC).

23. The method of claim 12, wherein the management server transmits information on completion of the washing cycle to the mobile communication terminal.

24. The method of claim 23, wherein the information on completion of the washing cycle is transmitted in a mode of a mobile instant message.

* * * * *